Sept. 30, 1969  P. A. V. FLEURY ETAL  3,470,453
FIELD-TUNABLE RAMAN LASER
Filed May 11, 1967  3 Sheets-Sheet 1

INVENTORS
P. A. FLEURY V
C. K. N. PATEL
R. E. SLUSHER
Y. YAFET

BY Wilford L. Wiener
ATTORNEY

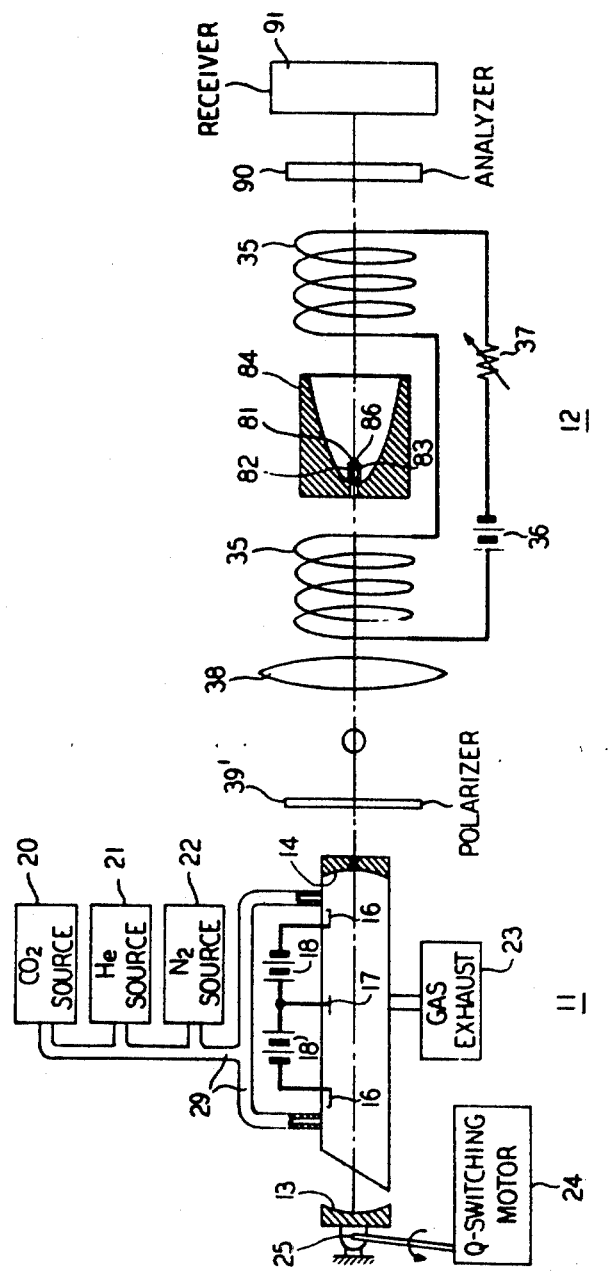

United States Patent Office 3,470,453
Patented Sept. 30, 1969

3,470,453
FIELD-TUNABLE RAMAN LASER
Paul A. V. Fleury, Plainfield, Chandra K. N. Patel, Chatham, Richart E. Slusher, Millington, and Yako Yafet, Maplewood, N.J., assignors to Bell Telephone Laboratories, Incorporated, Murray Hill, N.J., a corporation of New York
Filed May 11, 1967, Ser. No. 637,796
Int. Cl. H02m 5/16, 5/26; H01s 3/09
U.S. Cl. 321—69                                         3 Claims

ABSTRACT OF THE DISCLOSURE

A broadly tunable Raman device employs magnetic field tuning of new electronic Raman transitions in low-effective-mass semiconductors, such as indium antimonide. The new transitions are the spin-reversal transition and the $\Delta n=1$ transition, where $n$ is the Landau level quantum number. Both transitions are characterized by emitted radiation polarized orthogonal to the magnetic field when the pumping radiation is polarized parallel to the magnetic field or by emitted radiation polarized parallel to the magnetic field when the pumping radiation is polarized orthogonal to the magnetic field. In order to obtain these transitions, the pumping source, the scattered radiation resonator and the scattered radiation receiver are appropriately mutually adapted in view of these respective polarizations and the relative directions of propagation of the respective radiations.

The optical resonator can be selected to prefer one or more of the transitions, or to support all of the known electronic Raman transitions, specifically, spin-reversal, $\Delta n=1$ and $\Delta n=2$. An additional parabolic reflector facilitates observation of both spontaneous scattering and stimulated scattering.

CROSS-REFERENCE TO RELATED APPLICATION

This application relates to the general subject matter of the previously filed, copending application of P. A. Wolff, Ser. No. 522,174, now Patent No. 3,435,373 filed Jan. 21, 1966, and assigned to the assignee hereof.

BACKGROUND OF THE INVENTION

In the coherent optical device art, a highly desirable sort of device is one that is continuously tunable over a broad band of frequencies. An example of recent proposals for such devices is a device employing magnetic field tuning of an electronic Raman transition in low-effective-mass semiconductors, as disclosed in the above-cited, copending patent application of P. A. Wolff.

That application points out that an electronic Raman transition, involving Raman scattering from mobile (conduction band) charge carriers, should become stimulated and thus coherent with suitable adaptation of a magnetic field and a coherent pumping radiation. The frequency of the scattered light is dependent on the value of the magnetic field. Specifically, for the arrangement disclosed, the outgoing radiation frequency is the pump frequency less twice the cyclotron frequency.

SUMMARY OF THE INVENTION

We have found two other electronic Raman transitions in such low-effective-mass semiconductors, both transitions being characterized by emitted radiation polarized orthogonal to the magnetic field when the pumping radiation is polarized parallel to the magnetic field or by emitted radiation polarized parallel to the magnetic field when the pumping radiation is polarized orthogonal to the magnetic field. In contrast, the emitted Raman-scattered radiation from the apparatus described in the above-cited, copending application is polarized orthogonal to the magnetic field; and the effective component of the pumping radiation is also polarized orthogonal to the magnetic field.

According to a feature of our invention, the pumping radiation source and the scattered radiation receiver are mutually adapted to have the former supply a radiation polarized parallel to the magnetic field and the latter receive a radiation polarized transverse to, even when circularly polarized about, the field, or vice versa.

The two electronic Raman transitions we have discovered are a spin-reversal transition and the $\Delta n=1$ transition, where $n$ is the Landau level quantum number. There is no change of Landau-level quantum numbers in the spin-reversal transition; and the transition described in the above-cited, copending application of P. A. Wolff is the $\Delta n=2$ transition. Since the scattered light frequency is equal to the pumping light frequency minus the frequency corresponding to the energy change of the transition, these different transitions clearly involve different frequency shifts, although all three frequency shifts are tunable by variation of the magnetic field. There are therefore three possible tuning ranges.

According to a further feature of our invention, the optical resonator can be selected to prefer one or more transitions over the others or to support all three. This adaptability of the apparatus is one advantage of our invention.

BRIEF DESCRIPTION OF THE DRAWING

A more complete understanding of our invention can be obtained from the following detailed description, taken together with the drawing, in which:

FIG. 5 is a partially pictorial and partially block diagrammatic illustration of a fifth illustrative embodiment of the invention.

DETAILED DESCRIPTION OF ILLUSTRATIVE EMBODIMENT

Figure 1:
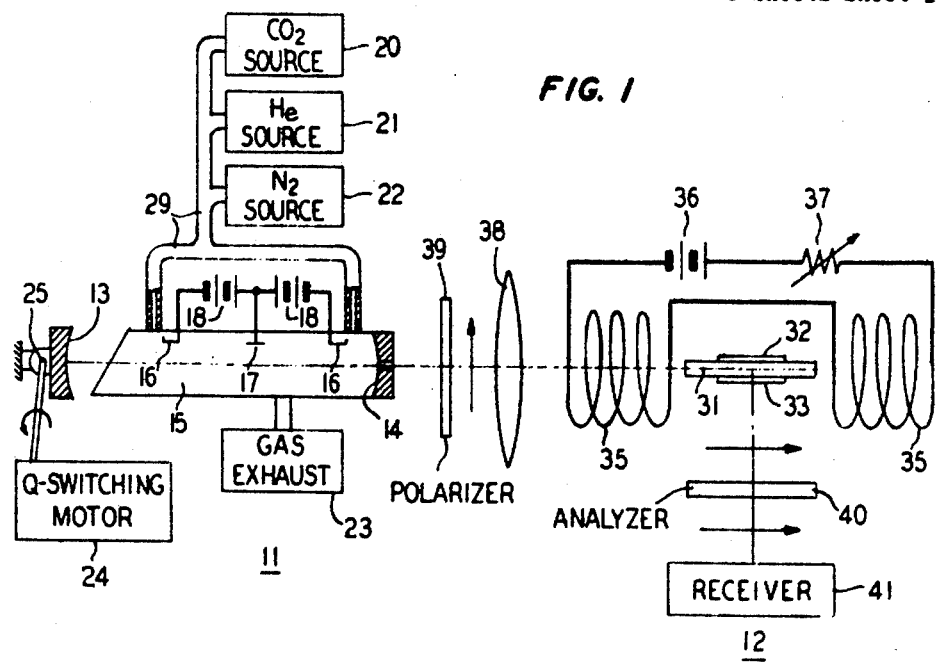
FIG. 1 is a partially pictorial and partially block diagrammatic illustration of a first illustrative embodiment of the invention.

In the preferred embodiment of FIG. 1, the high-power carbon dioxide laser 11 supplies coherent pumping radiation to the turnable Raman device 12.

The high-power pumping laser 11 is of the type described in the copending patent application of C. K. N. Patel, Ser. No. 495,844, filed Oct. 14, 1965, and assigned to the assignee hereof. It typically includes reflectors 13 and 14 forming a suitable resonator, direct-current power sources 18 connected in appropriate polarity between the anode and the cathodes, the carbon dioxide, helium and nitrogen sources 20, 21 and 22, respectively, connected to the inlet apparatus 19, and means for Q-switching the laser, including means 25 for rotatably mounting reflector 13, and a Q-switching motor 24 coupled to reflector 13 to rotate it. The reflector 14 has a transmissive central portion through which the output coherent radiation is directed toward Raman device 12. From the laser 11, as described, this radiation typically has a wavelength of 10.6 microns. The laser 11 should provide radiation having a photon energy less than the bandgap energy of crystal 31 in laser 12. The lens 38 focuses the beam in crystal 31 to a spot size about $1.0 \times 10^{-4}$ square centimeters.

In the embodiment of FIG. 1, the polarizer 39 polarizes the coherent laser radiation to be orthogonal to the direction of the magnetic field, which is directed along the axis of the coil 35 in Raman device 12. If the radiation from the carbon dioxide laser is already linearly polarized, a polarizer-and-anaylzer assembly is substituted for polarizer 39 to provide control over the polarization.

The Raman device 12 comprises a bar of n-type indium antimonide (InSb) of dimensions 1 x 2 x 10 cubic millimeters, the 2 millimeter dimension separating the reflectors 32 and 33 that form the resonator for the scattered radiation. The Raman device 12 further includes the Helmholtz coil 35 adapted to provide a uniform magnetic field within the central portion of crystal 31, and the direct-current voltage source 36 connected through the variable current-limiting resistance 37 to the terminals of the coil 35. A cooling apparatus (not shown) may also be provided to cool the crystal 31, preferably to 77° Kelvin or lower. Typically, it would comprise one or more cold fingers on a lateral surface of crystal 31 beyond the limits of reflectors 32 and 33.

The receiver 41 receives the tunable light scattered through the polarizer 40, which passes light polarized parallel to the magnetic field direction. Illustratively, the receiver 41 might include a material being tested with the tunable light, plus a photodetector. Nevertheless, it could be any one of a number of other means for utilizing the polarized tunable light.

The strength of the magnetic field of coil 35 should be such that the spacing of the cyclotron energy levels of conduction band electrons in crystal 31 is less than the bandgap energy of crystal 31 but sufficient to provide a significant frequency spacing between spin sub-levels of the Landau levels, as will be explained hereinafter. Fields up to 53 kilo-oersteds appear reasonable for our purposes.

The crystal 13 is a crystal of the low-effective-mass semiconductor indium antimonide grown to include a doping impurity such as selenium or tellurium in sufficient quantity to render the crystal n-type with about $3 \times 10^{16}$ conduction band electronic charge carriers per cubic centimeter. More broadly, the charge carrier concentration preferably lies in the range from $1 \times 10^{14}$ to $1 \times 10^{18}$ per cubic centimeter. Although selenium and tellurium are preferred dopants, sulfur or other donor impurities might be employed.

Instead of indium antimonide, crystal 31 could also be indium arsenide, gallium arsenide, lead selenide, lead telluride, mercury telluride or certain alloys of mercury telluride, to the extent the latter have bandgap energies greater than 0.12 electron volt. Scattering from holes in p-type materials of the compounds above-recited can also be achieved. However, the band degeneracy would lead to a short scattering time which is unfavorable to stimulated emission. We propose to lift the band degeneracy and lengthen the scattering time by applying uniaxial stress to the crystals. In general, other low-effective-mass non-degenerate energy band semiconductors could be employed.

The reflectors 32 and 33 are illustratively thin layers of vacuum-deposited metal or dielectrics. Alternatively, they could be highly polished surfaces of the crystals; or they could be spaced from the major surfaces of the crystal, if higher resonator Q's are desired. Whether deposited on crystal 31 or separate, reflectors 32 and 33 could also be curved to provide focusing, e.g., of the near confocal sort.

The Helmholtz coil 35 comprises two series-connected or parallel-connected sections spaced apart on opposite sides of crytsal 31. The separation of the two sections is equal to the coil radius.

In operation, the coherent 10.6 micron radiation from Q-switched carbon dioxide laser 11 is incident upon crystal 31 in pulses having peak power in the range from 1 to 100 kilowatts. It is focused to a cross section of about $1.0 \times 10^{-3}$ square centimeters in area. The resulting power density should exceed the threshold for stimulated Raman radiation in sufficiently perfect crystals 31, at least for the $\Delta n=1$ and spin-reversal transistions. If the threshold power density is otherwise supplied, Q-switching of laser 12 is unnecessary.

Figure 4:
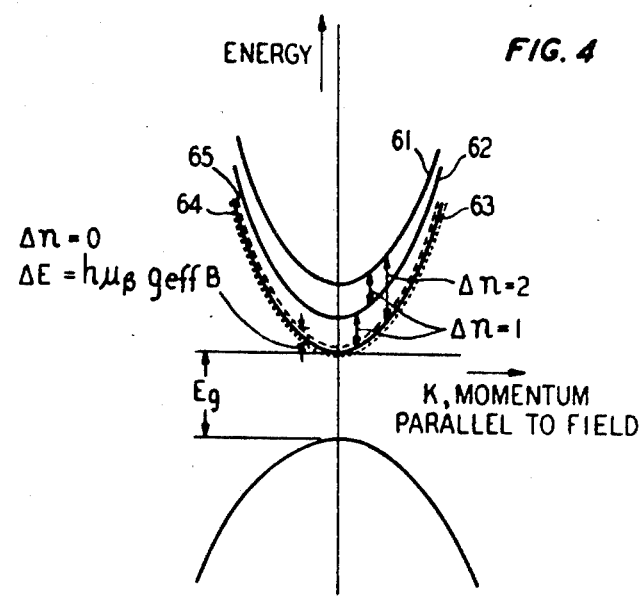
FIG. 4 shows an energy level diagram that will be helpful in understanding the theory and operation of the invention.

With reference to the energy level diagram of FIG. 4, the differences between these transitions may be explained as follows. The curves 61, 62 and 63 represent the total energy versus the momentum component parallel to the field for charge carriers subjected to the magnetic field. The separation of these curves represents a quantizing of the energy for any particular momentum parallel to the field. These energy states have a non-zero energy breadth and are also split by the differing possible spin states of the charge carriers. Two of the possible spin-energy states between which spin-reversal transitions can occur are illustratively those indicated by dashed curve 63 and dotted curve 64.

The energy separation of the Landau levels is approximately $$h\nu_c = \frac{heB}{m^*c} \qquad (1)$$

where $h$ is Planck's constant in appropriate units, $\nu_c$ is the cyclotron frequency, $c$ is the velocity of light, $m^*$ is the effective mass of an electron in the conduction band of crystal 31, $e$ is its charge and B is the magnetic field strength.

The energy separation of spin states between which a spin-reversal transition can occur is $$h\nu_s = h\mu_B g_{eff} B \qquad (2)$$

where $h$ is Planck's constant in appropriate units, $\nu_s$ is the spin frequency shift, $\mu_B$ is the Bohr magnetron, $g_{eff}$ is the effective gyromagnetic ratio within the crystal 31 and B is the magnetic field strength.

For indium antimonide, the effective mass of an electron is approximately 0.014 to 0.02 of the mass of a completely free electron; and the effective g factor is 30 to 50 and negative. For example, in indium antimonide with a carrier concentration of $5 \times 10^{16}$ cubic centimeters, a field of 26.2 kilo-oersteds gives a cyclotron energy of $h\nu_c \approx 0.0167$ electron volt and a spin-reversal energy $h\nu_s \approx 0.0068$ electron volt. A field of 36.7 kilo-oersteds gives a cyclotron energy of $h\nu_c \approx 0.023$ elecron volt and a spin-reversal energy $h\nu_s \approx 0.0094$ electron volt.

In the illustrative embodiment of FIG. 1, the 10.6 micron coherent pumping beam is polarized orthogonally to the magnetic field direction; and the output scattered light is polarized parallel to the magnetic field direction. In focusing the pumping beams with lens 38, care is taken to minimize nonlinear effects such as multiphoton pair production in the indium antimonide, as might result from too great a pumping power density. The output scattered light in this arrangement includes both light that is shifted down in photon energy from the pumping beam by $h\nu_c = 0.023$ electron volt ($\Delta n=1$) and light that is shifted down in photon energy by $h\nu_s = 0.0094$ electron volt (spin reversal) (for a field of 36.7 kilo-oersteds and carrier concentration of $5 \times 10^{16}$ per cubic centimeter). The spin-reversal transition is stronger than the $\Delta n=1$ transition. One of these may be suppressed, if the reflective coatings 32 and 33 are selectively reflecting at either the $\Delta n=1$ or spin-reversal down shifted frequency.

By tuning the magnetic field over a range of 100 kilo-oersteds, one can vary the energy downshifts of the $\Delta n=1$ and spin-reversal transitions through respective ranges of 0.057 electron volt and 0.02 electron volt.

Figure 2:
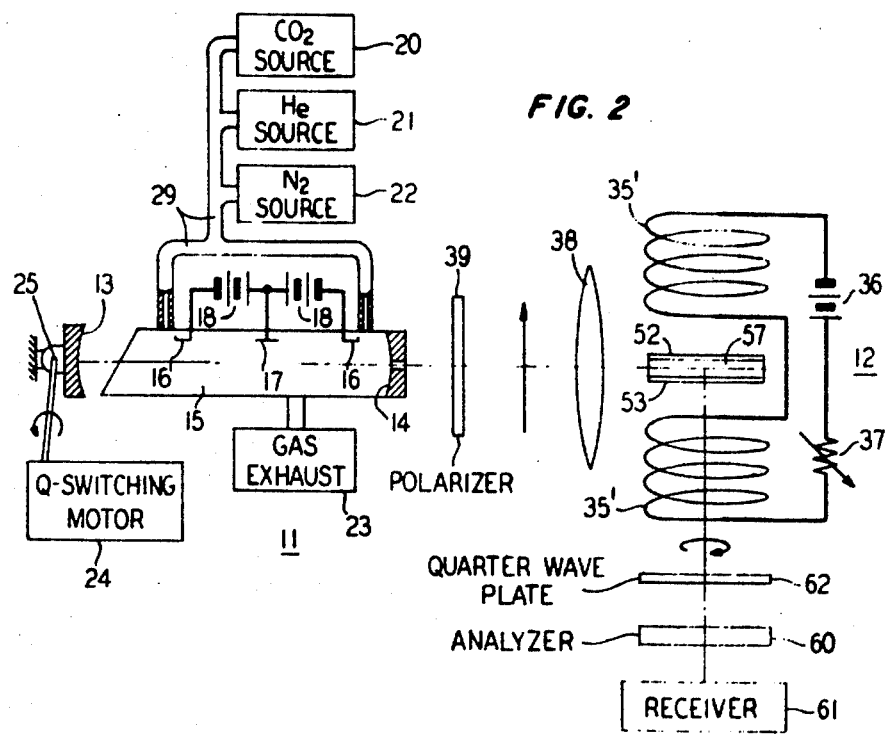
FIG. 2 is a partially pictorial and partially block diagrammatic illustration of a second illustrative embodiment of the invention.

In the illustrative embodiment of FIG. 2, the following modifications of the embodiment of FIG. 1 are made. The n-type InSb crystal 51, which is in the shape of a bar $1 \times 2 \times 10$ cubic millimeters and has a donor impurity concentration of $5 \times 10^{16}$ per cubic centimeter, is oriented with its 2 millimeter dimension orthogonal to the direction of the pumping laser light and parallel to the polarization of that light. The reflectors 52 and 53 are deposited on opposed surfaces of the crystal 51 so that they are separated by the 2 millimeter dimension. A Helmholtz coil 35′, essentially like coil 35 of FIG. 1, is oriented to apply the magnetic field parallel to the polarization of the pumping light. A quarter-wave plate 62 converts the circular polarization of the scattered light to a linear polarization, which analyzer 60 is oriented to pass to receiver 61.

In operation of the embodiment of FIG. 2, the output scattered light, propagating parallel to the direction of the magnetic field, is polarized orthogonally to the magnetic field, in the broad sense. Specifically, the out-going beam is circularly polarized around the magnetic field direction, both for $\Delta n = 1$ and spin-reversal transitions. The spin-reversal transition is stronger than the $\Delta n = 1$ transition and is also stronger than the spin-reversal transition obtained with the embodiment of FIG. 1.

Figure 3:
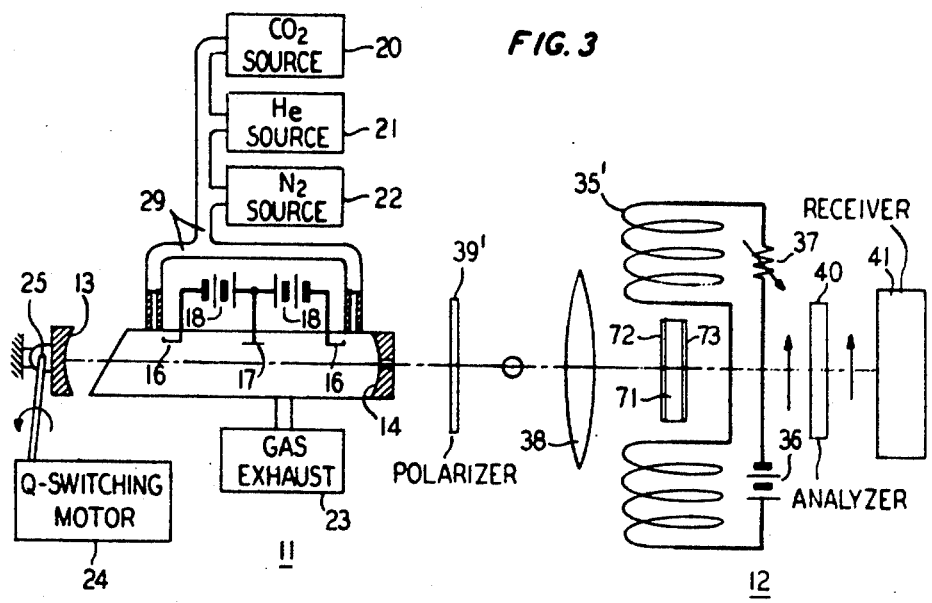
FIG. 3 is a partially pictorial and partially block diagrammatic illustration of a third illustrative embodiment of the invention.

In the illustrative embodiment of FIG. 3, the following modifications of the embodiment of FIG. 1 are made. The n-type InSb crystal 71, which has a donor impurity concentration of $5 \times 10^{16}$ per cubic centimeter, has a partially transmitting planar reflector 72 on its input end and a partially transmissive reflector 73 at the output end. The overall dimensions of the crystal 71 are as stated for FIGS. 1 and 2; and the 2 millimeter dimension occurs between reflectors 72 and 73. The crystal 71 is oriented with its 2 millimeter dimension parallel to the direction of propagation of the pumping radiation and with the 1 millimeter dimension and the surfaces of reflectors 72 and 73 parallel to the polarization of the pumping radiation. The Helmholtz coil 35′ is oriented to supply a magnetic field orthogonal to the polarization of the pumping radiation. The analyzer 40 is oriented, as in FIG. 1, to pass scattered light to receiver 41 polarized parallel to the direction of the magnetic field.

In the operation of the embodiment of FIG. 3, the observed Raman-scattered radiation is substantially the same as in FIG. 1.

In the illustrative embodiment of FIG. 5, the following modifications of the embodiment of FIG. 1 are made. The n-type InSb crystal 81, which has a donor impurity concentration of $5 \times 10^{16}$ per cubic centimeters, has planar reflectors 82 and 83 separated by its 2 millimeter dimension, as before, and has its 10 millimeter dimension parallel to the direction of the pumping radiation. The pumping radiation is polarized parallel to the surfaces of reflectors 82 and 83. Crystal 81 is also supplied with the 45° rooftop reflector 86, of which both surfaces are parallel to the polarization of the pumping radiation. The Helmholtz coil 35 is oriented to supply a magnetic field orthogonal to the polarization of the pumping radiation and parallel to the direction of propagation of the pumping radiation.

The crystal 81 is disposed at the focus of a parabolic reflector 84, which has its axis along the direction of propagation of the pumping radiation and has an aperture in the vicinity of the input end of the crystal to admit the pumping light.

In the operation of the embodiment of FIG. 5, the parabolic reflector 84 is effective to collect Raman-scattered light from a solid angle of 0.15 steradians. It greatly facilitates observation of both spontaneous scattering from the crystal 81 and the more highly directional coherent stimulated radiation. Thus, the onset of laser oscillation can be readily detected as the pumping power is increased. Which of the electronic Raman radiations will be passed by analyzer 90 depends on its orientation, therefore different portions of the scattered radiations can be passed to receiver 91 merely by rotating the analyzer 90. In other respects, the operation of the embodiment of FIG. 5 is substantially similar to the operation of the embodiments of FIGS. 1, 2 and 3.

It should be understood that in any or all of the foregoing embodiments there may also be Raman-scattered radiation resulting from the transition $\Delta n = 2$ as disclosed in the above-cited patent application of P. A. Wolff; but, with the exception of the embodiment of FIG. 5, this radiation will not be passed by the respective analyzers to the respective receivers. In the embodiment of FIG. 5, the $\Delta n = 2$ transition can be suppressed by adjusting the value of the magnetic field so that twice the cyclotron energy is greater than the photon energy of the pumping light.

What is claimed is:
1. A Raman device comprising a crystal of semiconductive material in which an electron has an effective mass less than the mass of a free electron, means forming an optical resonator including said crystal, means for applying a magnetic field to said crystal in a first direction,
   means for applying to said crystal polarized coherent pumping radiation, and
   means for receiving only scattered coherent radiation that is polarized transverse to said first direction when the effective portion of said pumping radiation is polarized parallel to said first direction and that is polarized parallel to said first direction when the effective portion of said pumping radiation is polarized transverse to said first direction,
   said resonator being adapted to resonate said scattered radiation.
2. A Raman device as claimed in claim 1 in which the crystal of semiconductive material has an effective gyromagnetic ratio $g_{eff}$ greater than the standard gyromagnetic ratio and nondegenerate energy bands and the means for applying a magnetic field applies a field of magnitude sufficient to produce substantially splitting of the spin energy sublevels of the cyclotron energy levels of said material in said magnetic field.
3. A Raman device according to claim 1 in which the crystal of semiconductive material comprises a nondegenerate energy band semiconductor having a bandgap energy greater than 0.12 electron volt the means for applying coherent pumping radiation comprises a laser including a gas mixture including carbon dioxide and means for Q-switching laser oscillation at 10.6 microns in said carbon dioxide, whereby scattered Raman radiation corresponds to a transition between adjacent cyclotron energy levels or a spin-reversal transition, and the receiving means includes an analyzer adapted to pass said Raman-scattered radiation corresponding to said transition.

References Cited

Slusher et al.: "Physical Review Letters," Jan. 16, 1967, pp. 77–79.

Yafet: "Physical Review," Dec. 9, 1966, pp. 858–862.

ROY LAKE, Primary Examiner

DARWIN R. HOSTETTER, Assistant Examiner

U.S. Cl. X.R.

307—88.3; 331—94.5